United States Patent [19]
Cotton

[11] Patent Number: 5,535,197
[45] Date of Patent: Jul. 9, 1996

[54] SHARED BUFFER SWITCHING MODULE

[75] Inventor: John M. Cotton, East Norwalk, Conn.

[73] Assignee: IPC Information Systems, Inc., Stamford, Conn.

[21] Appl. No.: 249,792

[22] Filed: May 25, 1994

Related U.S. Application Data

[63] Continuation-in-part of Ser. No. 766,062, Sep. 26, 1991, abandoned.

[51] Int. Cl.$^6$ .................................................. H04L 12/56
[52] U.S. Cl. .............................................. 370/60; 370/66
[58] Field of Search ................................ 370/58.1, 58.2, 370/58.3, 60, 60.1, 61, 92, 94.2, 65.5, 66, 67, 68, 118, 85.6; 340/825.5, 825.52

[56] References Cited

U.S. PATENT DOCUMENTS

| | | | |
|---|---|---|---|
| 3,796,835 | 3/1974 | Closs et al. | 370/60 |
| 4,603,416 | 7/1986 | Servel et al. | 370/60 |
| 4,823,340 | 4/1989 | Grassman et al. | 370/66 |
| 4,884,264 | 11/1989 | Servel et al. | 370/60 |
| 4,939,719 | 7/1990 | Bakka | 370/60 |
| 4,939,720 | 7/1990 | Bakka | 370/60 |
| 5,062,106 | 10/1991 | Yamazaki et al. | 370/85.6 |
| 5,130,979 | 7/1992 | Ohtawa | 370/58.1 |
| 5,280,475 | 1/1994 | Yanagi et al. | 370/60 |
| 5,303,233 | 4/1994 | Sugawara | 370/60 |
| 5,365,519 | 11/1994 | Kozaki et al. | 370/60 |

FOREIGN PATENT DOCUMENTS 0388648  2/1990  European Pat. Off. .

OTHER PUBLICATIONS

Kuwahara, Hiroshi et al., "A shared buffer memory switch for an ATM exchange", *Conference Record of the IEEE International Conference on Communications*, vol. 1, pp. 4.4.1–4.4.5, Boston, MA, Jun. 11–14, 1989.

Barri, P. and Goubert, J. A. O., "Implementation of a 16 to 16 Switching Element for ATM Exchanges", *IEEE Journal on Selected Areas in Communications*, vol. 9, No. 5, Jun., 1991, pp. 751–757.

Sakurai, Y. et al., "Large–Scale ATM Multistage Switching Network with Shared Buffer Memory Switches", *IEEE Communications Magazine*, Jan., 1991, pp. 90–96.

Veendrick, H. J. M., "The Behavior of Flip–Flops Used as Synchronizers and Prediction of Their Failure Rate", *IEEE Journal of Solid–State Circuits*, vol. SC–15, No. 2, Apr., 1980, pp. 169–176.

Horstmann, J. U., et al., "Metastability Behavior of CMOS ASIC Flip–Flops in Theory and Test", *IEEE Journal of Solid–State Circuits*, vol. 24, No. 1, Feb., 1989, pp. 146–157.

Kleeman, L. and Cantoni, A., "Metastable Behavior in Digital Systems", *IEEE Design & Test of Computers*, Dec., 1987, pp. 4–19.

Karol, M. J., et al., "Input v. Output Queueing on a Space–Division Packet Switch", *Conference Record IEEE Global Telecommunications Conference*, Houston, TX, Dec. 1–4, 1986, pp. 19.4.1–19.4.7.

(List continued on next page.)

*Primary Examiner*—Wellington Chin
*Assistant Examiner*—Chau T. Nguyen
*Attorney, Agent, or Firm*—Morgan & Finnegan

[57] ABSTRACT

This invention relates to a switch module for use in an asynchronous transfer mode (ATM) system incorporating a shared buffer memory where incoming data cells are stored and subsequently transferred to exit ports. An incoming data cell is stored at a vacant buffer memory address on an interleaved, word-by-word basis and the address is placed in an appropriate priority queue in the appropriate exit port for the data cell. When time is available for transmission from the exit port, the data cell corresponding to the address at the head of the highest priority queue is sent to the exit port and transmitted.

55 Claims, 7 Drawing Sheets

OTHER PUBLICATIONS

Eckberg, A. E. and Hou, T. -C., "Effects of Output Buffer Sharing on Buffer Requirements in an ATDM Packet Switch", *Proceedings of the Seventh Annual Joint Conference of the IEEE Computer and Communications Soc.*, New Orleans, LA, Mar. 29–31, 1988, pp. 51.4.1–5A–4.8.

DePrycker, M. et al., "An ATM Switching Architecture with Intrinsic Multicast Capabilities for the Belgian Broadband Experiment", *Proceedings of the Int'l Switching Symposium*, Stockholm, SE, May 28–Jun. 1, 1990, vol. V, pp. 111–118.

Henrion, M. A. et al., "Switching Network Architecture for ATM Based Broadband Communications", *Proceedings of the Int'l Switching Symposium,* Stockholm, SE, May 28–Jun. 1, 1990, vol. V, pp. 1–8.

Boettle, D. Henrion, M. A., "Alcatel ATM Switch Fabric and Its Properties", 1225 *Electrical Communication* 64 (1990) No. 2/3, Ramford, Essex, GB, pp. 156–165.

Sansom, R. D., "High–Performance ATM LAN Switches: Requirements and Architecture", Engineer Conference Notes Networld+Interop 94, Las Vegas, Nevada, May 4–5, 1994, pp. E6.1.

Alles, A., *ATM in Private Network, a Tutorial* (Interop '93 Version), Hughes LAN Systems.

FIG. 2

| SECTOR | ACTION | TRANSLATIONS | | |
|---|---|---|---|---|
| 0 | WRITE | P0-IN | P7-OUT | P13-IN |
| 1 | READ | P0-ADDR | P7-HEAD | P13-ADDR |
| 2 | WRITE | P4-OUT | P10-IN | |
| 3 | READ | P4-HEAD | P4-ADDR | |
| 4 | WRITE | P1-OUT | P7-IN | P14-OUT |
| 5 | READ | P1-HEAD | P7-ADDR | P14-HEAD |
| 6 | WRITE | P4-IN | P11-OUT | |
| 7 | READ | P4-ADDR | P11-HEAD | |
| 8 | WRITE | P1-IN | P8-OUT | P14-IN |
| 9 | READ | P1-ADDR | P8 | P14-ADDR |
| 10 | WRITE | P5-OUT | P11-IN | |
| 11 | READ | P5-HEAD | P11-ADDR | |
| 12 | WRITE | P2-OUT | P8-IN | P15-OUT |
| 13 | READ | P2-HEAD | P8-ADDR | P15-HEAD |
| 14 | WRITE | P5-IN | P12-OUT | |
| 15 | READ | P5-ADDR | P12-HEAD | |
| 16 | WRITE | P2-IN | P9-OUT | P15-IN |
| 17 | READ | P2-ADDR | P9-HEAD | P15-ADDR |
| 18 | WRITE | P6-OUT | P12-IN | |
| 19 | READ | P6-HEAD | P12-ADDR | |
| 20 | WRITE | P3-OUT | P9-IN | |
| 21 | READ | P3-HEAD | P9-ADDR | |
| 22 | WRITE | P0-OUT | P6-IN | P13-OUT |
| 23 | READ | P0-HEAD | P6-ADDR | P13-HEAD |
| 24 | WRITE | P3-IN | P10-OUT | |
| 25 | READ | P3-ADDR | P10-HEAD | |
| 26 | WRITE | UPDATE | | |
| 27 | READ | UPDATE | | |
| 28 | WRITE | UPDATE | | |
| 29 | READ | UPDATE | | |

ACTIVITY SEQUENCE

| SEGMENT/PORT | ACTIVITY |
|---|---|
| 15 | |
| 0 | IN-TRAN |
| 1 | WORD 10 TO BUFFER |
| 2 | WORD 6 TO BUFFER |
| 3 | WORD 2 TO BUFFER |
| 4 | WORD 11 TO BUFFER |
| 5 | WORD 7 TO BUFFER |
| 6 | WORD 3 TO BUFFER |
| 7 | OUT-TRAN |
| 8 | WORD 8 TO BUFFER |
| 9 | WORD 4 TO BUFFER |
| 10 | WORD 12 TO BUFFER |
| 11 | WORD 9 TO BUFFER |
| 12 | WORD 5 TO BUFFER |
| 13 | IN-TRAN |
| 14 | WORD 10 TO BUFFER |
| 15 | WORD 6 TO BUFFER |
| 0 | IN-TRAN/ADDR |
| 1 | WORD 12 FROM BUFFER |
| 2 | WORD 8 FROM BUFFER |
| 3 | WORD 4 FROM BUFFER |
| 4 | HEADER FROM BUFFER |
| 5 | WORD 9 FROM BUFFER |
| 6 | WORD 5 FROM BUFFER |
| 7 | OUT-TRAN/HEADER |
| 8 | WORD 10 FROM BUFFER |
| 9 | WORD 6 FROM BUFFER |
| 10 | WORD 3 FROM BUFFER |
| 11 | WORD 11 FROM BUFFER |
| 12 | WORD 7 FROM BUFFER |
| 13 | IN-TRAN/ADDR |
| 14 | WORD 12 FROM BUFFER |
| 15 | WORD 8 FROM BUFFER |
| 0 | HEADER TO BUFFER |
| 1 | WORD 11 TO BUFFER |
| 2 | WORD 7 TO BUFFER |
| 3 | WORD 3 TO BUFFER |
| 4 | OUT-TRAN |
| 5 | WORD 8 TO BUFFER |
| 6 | WORD 4 TO BUFFER |
| 7 | WORD 13 TO BUFFER |
| 8 | WORD 9 TO BUFFER |
| 9 | WORD 5 TO BUFFER |
| 10 | IN-TRAN |
| 11 | WORD 9 TO BUFFER |
| 12 | WORD 6 TO BUFFER |
| 13 | HEADER TO BUFFER |
| 14 | WORD 11 TO BUFFER |
| 15 | WORD 7 TO BUFFER |
| 0 | |

FIG. 4 SWITCH MODULE OUTPUT PORT

SHARED BUFFER SWITCHING MODULE

RELATED APPLICATION

This patent application is a continuation-in-part of the following application titled Channel Allocation Systems for Distributed Digital Switching Network, U.S Ser. No. 07/766,062, filed Sep. 26, 1991, now abandoned.

This invention pertains to a buffered communication switch and, more particularly, to a buffered communication switch suitable for use in ATM (Asynchronous Transfer Mode) systems.

BACKGROUND OF THE INVENTION

In the early 1980's the CCITT (Consultative Committee on International Telephone and Telegraph), working under the auspices of the United Nations and the International Telephone Communications Union, developed standards for Narrow Band Integrated Services Digital Networks (N-ISDN) to allow limited capability for digital traffic in public networks. In the mid 1980's the CCITT study group began working on the communications successor referred to as the broadband ISDN (B-ISDN). The object of the B-ISDN was to eventually replace the entire public network infrastructure with a single communications fabric for all types of communications traffic. In 1988 the CCITT decided to base the B-ISDN development on ATM (Asynchronous Transfer Mode). In June, 1992 the ATM Forum was founded and it has since become the driving force in setting ATM specifications. ATM network systems, because of their high speed and capability of carrying all classes of communication traffic including voice, video and data, are commonly referred to as the communication superhighway.

ATM standards require that data be sent in small cells of fixed length. The ATM cell contains fifty-three octets (bytes) of which the first five bytes are a header (including a one-byte header check sum) and the remaining forty eight bytes are a data payload. ATM is a connection-oriented technology where a cell is routed through one or more intelligent switches each capable of interpreting the header and sending the cell onto a specific link headed toward its destination. Because of the relatively short cell length, cells from different communications can be interleaved on the same communication link. This means that ATM systems can handle time sensitive traffic, such as voice or video, since the cells are not delayed at a switching node waiting for completion of a long packet transmission as would be the case with prior packet switching technology.

Another advantage of the ATM approach is that the header includes data that specifies the priority of the cell. Time sensitive traffic is normally assigned a high priority. Computer data can be assigned a priority according to the customer's needs and willingness to pay. The priority can be used at each switching node to determine the order in which cells will be transmitted on the outgoing links.

In ATM systems, since there is often a need to delay a cell transmission waiting for higher priority traffic, an efficient buffering system is required at each switching node. Because of the high speed operation of most ATM systems, an efficient throughput can become essential.

One of the prior ATM switch designs incorporates a shared bus. This design uses cell buffering at the input port, and passes cells from an input port to an output port over a shared bus. Some method of arbitration is used to assign the shared bus capacity. Since congestion occurs at the output ports, the arbitration must not allow an input port to pass a cell to an output port which is overloaded. Subsequent cells are blocked at the input port and suffer unnecessary delay, unless a mechanism is provided to bypass the blocking cell. The shared bus must be very high speed because it is shared by many high speed inputs. Buffer usage is relatively inefficient, because each port has a separate buffer, and must provide worst case buffering. Multicast (from one to many) is difficult to achieve on a shared bus.

Another prior switch design incorporates banyan networks which consist of networks of switch nodes having two input ports and two output ports. These use a prepended address code, which is used one bit at a time to make a binary routing decision at each switch node. There are many variations, some of which require buffers at each node, as well as buffers at the output port of the nodal network. Buffering at each node is particularly inefficient, since every node must consider a worst case condition. Buffering at the output can allow a shared buffer possibility, but such shared arrangements become complicated. Subsidiary multicast networks are possible, but these further complicate the internal buffering requirements.

Crossbar switches have also been proposed for ATM switching. A crossbar switching structure is based on the provision of rectangular switches with buffering at each crosspoint. This is an implementation extension of the nodal banyan switch, but is somewhat better because it is more easily extensible. Buffer usage is inefficient, however, and multicast is not easy to achieve.

A non-blocking space switch with output buffers has also been proposed. This requires the use of a non-blocking space switch (known as a Clos Network) to route between the input ports and the output ports, with buffers on the output, either individual (inefficient) or shared. Multicast may require the further addition of buffers at the input ports. The shared buffers, if used, are complicated and look very much like a switch in their own right.

Another approach is to use shared memory switching in ATM systems. Cells are transferred into and out of a shared memory on a cell-by-cell basis. The memory becomes both the buffering and the switching medium. Incoming cells are buffered in the shared memory, and are fetched from the memory by the output ports. For multicast, the cell buffer is not reused until all the necessary output ports have taken the cell. Memory usage is efficient, but the memory must be very high speed.

SUMMARY OF THE INVENTION

The system according to the invention is a switching module incorporating a shared memory buffer. When a cell is received, the header is translated to determine the appropriate routing toward its destination and to determine cell priority. The cell is then stored at a vacant address in a shared buffer memory and the address for the cell is placed in a queue at the appropriate exit port. As soon as time is available for transmission on the outgoing link, the cell corresponding to the address at the front of the queue at the exit port is transmitted toward its destination.

Each of the exit ports preferably includes several FIFO (First In First Out) registers to provide separate address queues for different cell priority levels. As previously mentioned, the header of each incoming cell is translated to determine the appropriate exit port or ports and to determine the priority of the cell. The buffer memory address used to store the cell is placed in the appropriate priority queue at the exit port or ports. The cells in the highest order priority queue are transferred out of an exit port first, followed by cells in the successively lower priority queues.

The system is preferably designed for a maximum data throughput into and out of the shared buffer memory. This is achieved according to one aspect of the invention by transferring cells to and from the shared buffer on an interleaved word-by-word basis rather than a cell-by-cell basis. The standard cell according to ATM standards includes fifty-three octets (bytes). One word from each incoming and outgoing cell is transferred between the ports and the shared buffer in succession. This interleaved sequence is followed by another word from each of the cells being transferred and so on. Transfer on an interleaved word-by-word basis increases the data throughput by eliminating delay in the cell transfer waiting for some of the slower operations, such as header translation.

The shared memory technique according to the invention facilitates multicasting (from one to many) which is within the ATM specifications but not easily achieved in most systems. This is easily accomplished according to the invention by storing a cell address in more than one exit port and not releasing the cell address until the cell has been transmitted from each of the designated ports.

With the shared memory technique according to the invention it is necessary to keep track of the shared memory addresses currently in use so that incoming cells can be assigned to unused addresses. One technique according to the invention is to maintain a bit map corresponding to each of the address locations. When a new cell arrives, the bit map is searched using a high-speed content addressable technique and the first available unused address is assigned for storage of the incoming cell. When the cell transmission is complete, the bit map is changed to indicate that the address is no longer in use. Another technique is to maintain a linked list of vacant addresses. The address at the head of the list is assigned to an incoming call and the head pointer is advanced to the next vacant address. After transmission of the cell from all of the designated exit ports is complete, the address is added to the end of the linked list and the tail pointer for the linked list is moved accordingly.

BRIEF DESCRIPTION OF THE DRAWINGS

Illustrative embodiments of the invention are set forth in the following more detailed specification. The specification includes the drawings wherein:

FIG. 2 is a timing diagram for the control sequence of the switching module;

OVERALL SWITCH MODULE LAYOUT

Figure 1:
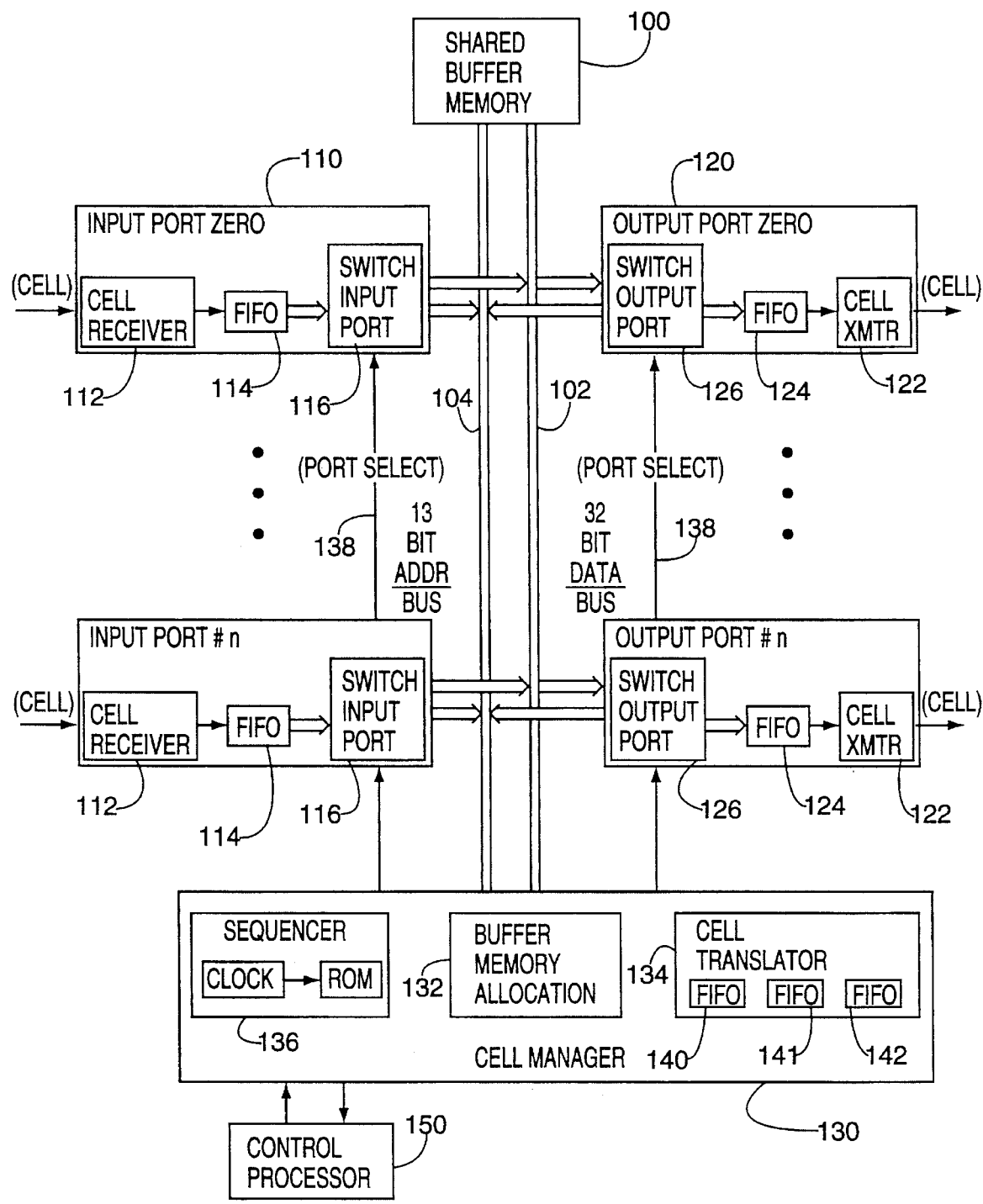
FIG. 1 is a block diagram of the overall switching module according to the invention.

The overall layout for the switch module according to the invention is illustrated in FIG. 1 including a shared buffer memory 100 which is used to store data cells while being transferred from an input port to selected output ports. According to a preferred embodiment, data is transferred to and retrieved from memory 100 via a 32-bit data bus 102 and is addressed by means of a 13-bit address bus 104. A data cell according to ATM standards includes 53 octets (i.e. 53 8-bit bytes). One of these bytes is a header check sum which is removed at the input port after being used to check the header. The data cell with the check sum removed consists of 52 8-bit bytes and can be stored in the buffer memory as 13 32-bit words. To simplify addressing, a 16-word space is allocated for each data cell even though only 13 words are required. A data cell address is defined by the 9 most significant bits of the memory address, the remaining 4 bits being used to identify the location of the individual words making up the data cell.

The first input port 110 (referred to as input port zero) receives the incoming data cell in serial format via a cell receiver 112. One of the important functions of the cell receiver is to compare the header with the check sum contained in the fifth byte of data cell. If the header is valid, the check sum is removed and the remaining 52 bytes are passed on to a FIFO register 114. The FIFO register must be capable of storing at least one complete data cell, and preferably as many as three data cells. The serial data cell is delineated and emerges as 52 8-bit bytes. The data cell passes from FIFO 114 through a switch input port 116 where it is converted to a 32-bit word format. The data cell is then transferred into buffer memory 110 via a data bus 102 to a location determined by the address on address bus 104.

The first output port 120 (output port zero) is used to retrieve a data cell from a selected address via data bus 102. The data cell is received in a 32-bit word format by switch output port 126 and is passed on to a FIFO 124 in an 8-bit byte format. The data cell emerges from the FIFO and passes through a cell transmitter 122 which adds a header check sum as the fifth byte of the cell and transmits it in a serial format.

The first input port 110 and the first output port 120 are shown on the left and right, respectively, for ease of illustration. In an actual system the first port would normally include both input port 110 and output port 120 so that bidirectional communications can be established via a link connected to the port. The number of such ports in a switch module is a matter of engineering choice and depends largely on the desired operating speed for the module. For the illustrative embodiment a switch module with sixteen ports was selected. The input ports each similarly include a cell receiver 112, a FIFO 114 and a switch input port 116, whereas the output ports each include a switch output port 126, a FIFO 124 and a cell transmitter 122. The transceiver and cell delineation functions can be achieved using commercially available chips. Transceivers operating at 155 Mb/s are available from TranSwitch as TXC-02301 and TXC-03003. Transceivers operating at 100 Mb/s are available from TranSwitch as AM7968 and AM7969. A suitable cell delineation block chip is available from TranSwitch as TXC 05150.

The data transfer within the switch module and the buffer addressing is controlled by a cell manager 130 which includes a buffer memory allocation unit 132, a cell translator 134 and a sequencer 136. The cell manager has access to data bus 102 and address bus 104. The cell manager is connected to activate a selected port via the port selection lines 138. In addition, the cell manager supplies addresses to the switch ports 116 and 126 as well as numerous control functions via connections not shown in FIG. 1.

When a data cell is received at a switch input port, the header of the cell is transferred to translator 134 which determines the appropriate output port for the cell and the priority of the cell. The buffer memory allocation 132 finds a vacant memory location and the incoming cell is transferred to that location on a word-by-word basis. The address is also stored in a priority queue at the appropriate output port or ports. When the selected output port becomes available and the address is at the head of the queue, the corresponding data cell is retrieved from the buffer memory and transmitted from the selected port.

Shared buffer memory 100 can be of any size required by the switch. For the illustrative embodiment with sixteen input ports and sixteen output ports, a memory capable of storing 512 data cells was selected. These data cells are addressed by the nine most significant bits on the address bus. A data cell is stored in a sixteen 32-bit word space. A memory of 32K bytes is therefore selected for this illustrative embodiment.

A control processor 150 is coupled to cell manager 130. The principal task performed by the control processor is creating and deleting virtual paths (VP) and virtual circuits (VC) between the associated switch modules and other switches or interfaces in the network. The control processor is capable of receiving its own program and data in data cells from the network.

Activity Sequence

The sequence for the various activities in the operation of the switch module is controlled by sequencer 136 shown in FIG. 1. The sequencer includes a ROM (read only memory) addressed by a clock and counter combination operating in a closed repetitive sequence. In the chosen embodiment, which has 16 ports, a 24-bit word is stored in the ROM for each step in the sequence. The output bits from the ROM selectively control port selection, IN-translation read/write, OUT-translation read/write, buffer memory read/write, and cell release control. The repetitive sequence is divided into 30 segments with each segment being further subdivided into 16 sectors, one sector for each of the ports in the switch module. The complete timing sequence includes 480 steps and therefore 480 words are stored in the ROM.

The basic sequence of operations for an incoming data cell starts with translation of the header to determine the appropriate output port and the cell priority. A vacant address is allocated in the buffer memory and the incoming data cell is transferred to that address on a word-by-word basis. The storage of a word in memory using relatively inexpensive, commercially available components requires about 18 nanoseconds. The translation and memory allocation operations require on the order of 90 nanoseconds. The translation operation therefore creates a bottleneck for the throughput of data through the switch. A similar bottleneck occurs during the transmission of a data cell since, because of possible multicasting, a further translation operation is used to insure that the header is correct for each selected transmission link.

The activity sequence according to the invention transfers data to and from the buffer memory on a word-by-word basis arranged so that the data transfers are not delayed by the slower translation and allocation functions. The activity sequence is illustrated in FIG. 2 including a 30-sector primary sequence (to the left in the illustration) wherein each sector is subdivided into 16 segments with one segment for each port. The starting points for the word-by-word transfers of data cells from the different ports are distributed through the timing sequence so that the slower translation and allocation operations can be carried out while data is being transferred to and from the shared memory with respect to other ports.

The first line of the sector portion of the timing sequence in FIG. 2 is for sector "0" which is primarily for "write" operations where words of data can be transferred to the shared buffer memory from each of the input ports. The header translation operations for P0-IN (port zero—input translation), for P7-OUT (port seven—output translation), and P13-IN (port 13—input translation) are also initiated during sector zero. The sequence for sector "0" is set forth in greater detail in the segment/port activity portion of the illustration to the right in FIG. 2.

In segment "0" (of sector "0") the first word of the data cell, which includes the header, is transferred to translator 134 (FIG. 1) and the IN-TRAN translation commences to determine the cell priority and the appropriate output port. The results from the translation are stored in a FIFO register within translator 134 when the translation is completed. In segment "1" the transfer of the data cell from port one is already underway and the 10th word of the data cell is transferred to the shared buffer memory. Similarly, during segments "2" to "6" the 6th, 2nd, 11th, 7th, and 3rd words from ports 2 to 6, respectively, are transferred to the shared memory. In segment "7" the header from the data cell in output port 7 is transferred to translator 134 and the results of the OUT-TRAN translation are stored in a second FIFO register when completed. In segments "8" to "12" the 8th, 4th, 12th, 9th, and 5th words from ports 8 to 12, respectively, are transferred to the shared memory. In segment "13" the header from the data cell in input port thirteen is transferred to translator 134 and the results are stored in a third FIFO register within translator 134 when the IN-TRAN translation is completed. During segments "14" and "15" the 10th and 6th words are transferred from ports fourteen and fifteen, respectively.

Sector "1" of the timing sequence is primarily for "read" operations, that is, retrieval of data cells from the shared memory by the output ports. In addition, the port 0 and port 13 data cell addresses are distributed (P0-Addr and P13-Addr) and the revised header for the outgoing link is received by port 7 (P7-Head). More specifically, during sector 1, segment 0, the results of the port zero translation for the incoming cell are in the first FIFO register of translator 134 and buffer memory allocation 132 indicates a vacant memory address. During the IN-TRAN/Addr operation the vacant address is sent to the first input port to control transfer of the data cell to the memory and is also sent to the appropriate output port together with the priority indication for the cell. During segments "1" to "3", the 12th, 8th and 4th words of the respective data cells are delivered to output ports 1 to 3. Next, during segment "4", the header is transferred to output port 4. During segments "5" and "6", the 9th and 5th words are delivered to their respective output ports. During segment "7" the OUT-TRAN/Header operation takes place where the modified header is transferred to output port 7. During segments "8" to "12", the 10th, 6th, 3rd, 11th and 7th words are transferred respectively to output ports 8 to 12. During segment "13" a vacant memory address is transferred to input port 13 and to the selected outpost port. During segments "14" and "15" the 12th and 8th words are transferred to respective output ports 14 and 15.

It is important to note that the translator operations IN-TRAN and OUT-TRAN are each separated by five or more segments. This separation permits the slow translator operations to be carried out while the faster word transfer operations go forward.

The translator operations are distributed more or less evenly throughout the activity sequence. The read and write operations for the words of the data cell come in sequence after completion of the respective translation operations.

The port activity sequence, as seen from port zero, is extracted from FIG. 2 and is set forth in the following table:

| PORT ZERO ACTIVITY SEQUENCE | | | | |
|---|---|---|---|---|
| Sector | Action | Data | Port | Cell |
| 0 | Write | Incoming Header (IN-TRAN) | IN | N |
| 1 | Read | Buffer Address (result of IN-TRAN/Addr) | IN | N |
| 2 | Write | Incoming header to buffer | IN | N |
| 3 | Read | Data word 4 from buffer | OUT | M-1 |
| 4 | Write | Data word 1 to buffer | IN | N |
| 5 | Read | Data word 5 from buffer | OUT | M-1 |
| 6 | Write | Data word 2 to buffer | IN | N |
| 7 | Read | Data word 6 from buffer | OUT | M-1 |
| 8 | Write | Data word 3 to buffer | IN | N |
| 9 | Read | Data word 7 from buffer | OUT | M-1 |
| 10 | Write | Data word 4 to buffer | IN | N |
| 11 | Read | Data word 8 from buffer | OUT | M-1 |
| 12 | Write | Data word 5 to buffer | IN | N |
| 13 | Read | Data word 9 from buffer | OUT | M-1 |
| 14 | Write | Data word 6 to buffer | IN | N |
| 15 | Read | Data word 10 from buffer | OUT | M-1 |
| 16 | Write | Data word 7 to buffer | IN | N |
| 17 | Read | Data word 11 from buffer | OUT | M-1 |
| 18 | Write | Data word 8 to buffer | IN | N |
| 19 | Read | Data word 12 from buffer | OUT | M-1 |
| 20 | Write | Data word 9 to buffer | IN | N |
| 21 | Read | Old outgoing header from buffer | OUT | M |
| 22 | Write | Old outgoing header for OUT-TRAN | OUT | M |
| 23 | Read | New outgoing header for OUT-TRAN | OUT | M |
| 24 | Write | Data word 10 to buffer | IN | N |
| 25 | Read | Data word 1 from buffer | OUT | M |
| 26 | Write | Data word 11 to buffer | IN | N |
| 27 | Read | Data word 2 from buffer | OUT | M |
| 28 | Write | Data word 12 to buffer | IN | N |
| 29 | Read | Data word 3 to buffer | OUT | M |

For an incoming data cell at port zero, the translation is performed during sector "0" and the vacant address for the incoming data cell is supplied to the ports in sector "1". The header is written into the buffer memory in sector "2" and the following twelve words of the incoming data cell are written into memory in sectors "4", "6", "8", etc.

For an outgoing data cell at port zero the sequence begins at sector "21" where the original header of the data cell is transferred to port zero and in sector "22" where the header is transferred to the translator. The results of the translation are returned to output port zero as a new header in sector "23". Data words 1, 2, and 3 are transferred to output port zero in sectors "25", "27" and "29".

Data word 4 is transferred to output port zero in sector "3" and data words 5 to 12 are transferred in sectors "5", "7", "9", "11", "13", "15", "17", and "19".

The Switch Module Input Port

Figure 3:
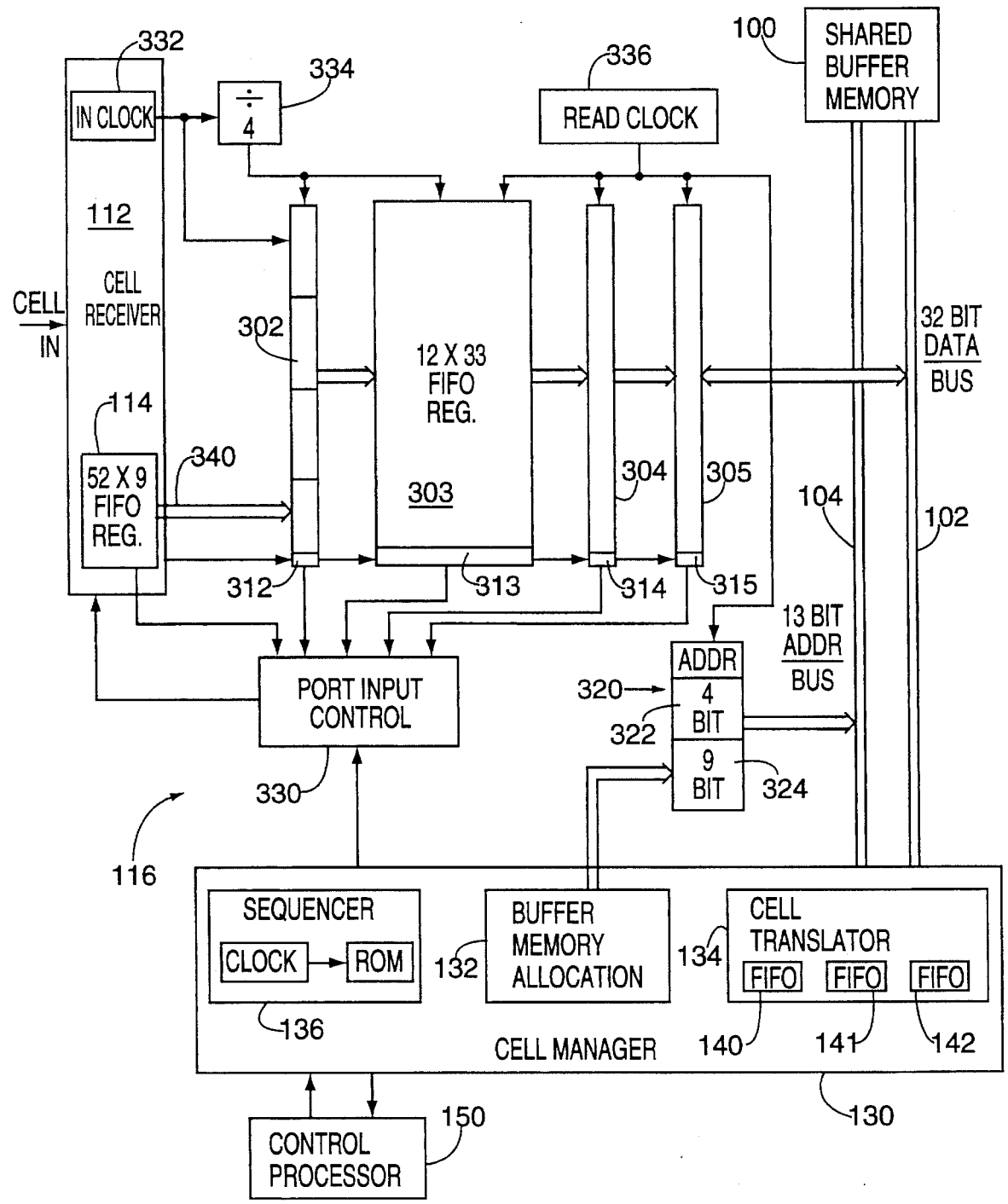
FIG. 3 is a schematic diagram of the switch module input port.

Switch module input port 116, described in FIG. 1, is shown schematically in FIG. 3. An incoming data cell including fifty-three octets (bytes) passes through the cell receiver 112 where the header is compared with the check sum in the cells. If the data cell is valid, the check sum is removed and the remaining fifty-two bytes are passed on to one or more FIFO's 114. The data cell is organized into 52 eight-bit bytes in FIFO 114. The data cell is transferred out of the FIFO in 9-bit words each including an 8-bit data byte and a 9th bit which is a "1" only if it accompanies the last byte of a data cell.

The data cell is reorganized into 32-bit words in the switch module input port. A vacant buffer memory address is assigned by buffer memory allocation unit 132. The data cell is then transferred to shared buffer memory 100 on a word-by-word basis under the control of sequencer 136.

The transfer of the data cell from FIFO 114 to data bus 102 is accomplished by registers 302–305. Shift register 302 is a thirty-three-bit arrangement designed to receive 9-bit words from FIFO 114 via a 9-bit bus 340. Each 9-bit word includes an 8-bit byte of data plus a 9th bit which is "0" unless the word is the last word of a data cell. The transfer from FIFO 114 to register 302 is controlled by a clock 332 which is part of cell receiver 112. When four data bytes have been transferred into register 302 and successively moved up in the register, register 302 is full including 32 data bits and a locator bit in the 33rd bit location 312. The 32-bit data word plus locator bit is transferred into a 12×33 FIFO register 303. The transfer into FIFO 303 is achieved by dividing clock 232 by four in a divider 334. Divider 334 provides a shift pulse for every 4 data bytes from FIFO 114. The 33rd bit is used for the locator bit which indicates the end of the data cell as it passes through FIFO 303. Registers 304 and 305 are each 33-bit registers for transfer of the 32-bit words. These registers include bits 314 and 315 respectively, to provide cell location. Register 305 is capable of receiving data from register 304 as well as from data bus 102. Register 305 is also capable of transferring data to shared buffer memory 100 via data bus 102.

An address unit 320 is used to provide data addresses via bus 104 for locating transferred data in the shared buffer memory. The address unit includes a 9-bit register 324 which receives data cell addresses from buffer memory allocation unit 132. The address unit also includes a 4-bit counter 322 which provides the least significant bits of a memory address. To simplify addressing each data cell has a space allocation of sixteen 32-bit words, even though a 13-word space would be adequate for a data cell. This is done to simplify the addressing since, with the arrangement in the illustrative embodiment, each of the 9-bit words in register 324 is capable of defining a data cell space in memory. Thus, the 9-bit register 324 can uniquely identify 512 data cell spaces in the shared memory, whereas counter 322 provides an additional 4 bits which define the individual word locations of the data cells. In operation, when a data cell is to be transferred, a 9-bit address is transferred into register 324 and counter 322 is initially set to zero so that it points to the start of the space allocated for the data cell. Counter 322 is advanced each time a data word is transferred to the memory so that address unit 320 always points to the address for the next word to be transferred from the input port to buffer memory 100.

A read clock 336 is controlled by sequencer 136 and a port input control unit 330 (through connections not shown). The read clock controls the transfer of data out of the FIFO register 303 and registers 304, and 305 into the buffer memory. The port input control 330 receives signals from the locator bits 312–315 in the registers 302–305. Locator bits 312–315 indicate the location of the end of the data cell being passed through the registers. Control unit 330 also receives an indication as to when FIFO 114 in the cell receiver is full and ready to transfer a data cell. The port input control 330 further controls the in-clock for transfer of the data into the registers 302 and 303 as well as read clock 336 which controls the transfer of the data cell from registers 303–305 into shared memory 100.

The operation of the switch module input port in FIG. 3 starts with a data cell being received by the cell receiver which compares the check sum with the header to determine if a valid data cell has been received. If so, the check sum is removed and the remaining 52 bytes of the data cell are transferred into a FIFO 114. When the registers in the switch module input port are empty, a data cell is transferred from FIFO 114 into registers 302 and 303. In the transfer through register 302 the 8-bit bytes are converted into 32-bit words.

The transfer of the data cell into the shared memory commences by stepping the data cell into registers 304 and 305 so that the cell header is located in register 305. The header is transferred to translator 134 in the cell manager which examines the header and determines the appropriate output port and priority status of the data cell. The designated output port and priority status are stored in one of the output FIFOs, such as 140. Buffer memory allocation unit 132 provides a vacant memory address to address register 324.

The transfer of the data cell to the vacant address in buffer memory 100 on a word-by-word basis is controlled by sequencer 136. The data cell is stepped to the right toward register 305 each time a word is transferred to the buffer memory via the data bus. Each transfer also advances the address counter 322 by one step so that the address unit 320 always points to the next word address. Each transfer of a data word to the shared memory via data bus 102 is to the address to which the address unit 320 points via address bus 104.

The switch module input port must also include the capability of handling special meta signaling cells. Certain virtual paths and virtual circuits are set aside for signaling purposes. For example, a terminal station may request virtual path/virtual circuit information for reaching a certain destination. When such a meta cell is detected in the translator, the translation must provide a new header in addition to assigning a buffer space and selecting an outgoing port. The outgoing port will connect to the control processor 150, and the new header will distinguish which incoming port received the meta cell. Other traffic management cells may be received and detected by the translator. These cells require traffic information to be returned to the sender, so the requested information is inserted into the data section of the cell which is then returned to the originating terminal via the output port for the same link with an appropriately modified header.

The switch module input port must also be capable of receiving data cells which are addressed to control processor 150 associated with the switch module.

Switch Module Output Port

The switch module output port 120 retrieves data cells from shared memory 100 according to the addresses at the head of a priority queue.

Figure 4:
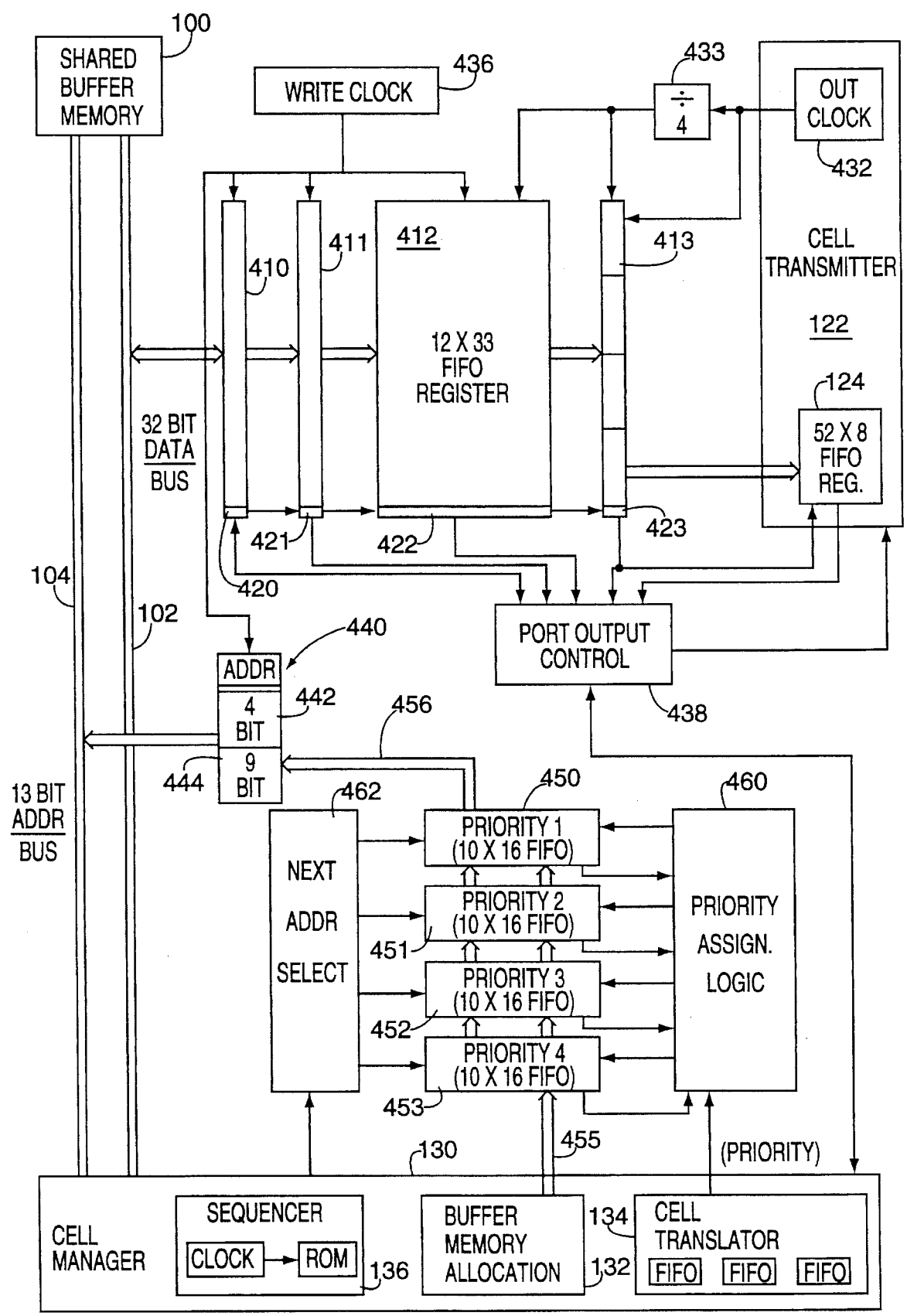
FIG. 4 is a schematic diagram of the switch module output port.

The number of priority classifications is a matter of design, but a four-level priority appears to be adequate for most purposes and is used in the illustrative embodiment. The switch module output port, as illustrated in FIG. 4, includes four separate priority queues, i.e. FIFOs 450–453. The FIFOs are each 10 bits wide in order to accept a 9-bit data cell address plus an additional bit for indicating congestion. The length of the FIFO is a matter of design depending on the anticipated needs. The capacity to store 16 addresses at each priority level should be adequate for most purposes and is used in the illustrative embodiment.

When a data cell is received via the switch module input port, the header is transferred to cell translator 134 which determines the appropriate output port and the cell priority. Buffer memory allocation unit 132 provides a vacant address for storing the incoming data cell. This address is sent to the selected output port via bus 455 and the priority information is provided to the priority assignment logic 460. The priority assignment logic directs the incoming address to the priority FIFO 450–453 corresponding to the priority status. Each of the priority FIFOs are arranged to detect congested conditions when more than 12 addresses are in the priority queue. Any such congestion is indicated in the 10th bit associated with a 9-bit address.

The switch module output port includes an address unit 440 similar to the address unit in the switch module input port. The address unit includes a 9-bit register 444 for the data cell address and a 4-bit counter 442 which points to the word address within the data cell. A next address select unit 462 selects the address at the head of the highest priority queue and transfers that address to register 444 when a data cell is to be transmitted.

Registers 410–413 are used to receive the data cells from memory 100 via data bus 102 in a 32-bit word format. Register 410 can receive a data word from the data bus or can supply a data word to the data bus. When a data cell is being transmitted, the first word, which is the header, is first transferred to register 410 from memory 100. The header is then transferred from register 410 to translator 134 via the data bus and subsequently modified and returned to register 410. The data cell is then stepped into registers 410–412 word at a time under control of a write clock 436 through interconnections not shown in FIG. 4.

The transfer of a data cell to cell transmitter 122 via register 413 is controlled by an out clock 432 in the cell transmitter. The out clock controls the transfer of the data cell in 8-bit bytes from register 413 into 52×8 FIFO register 124. Out clock 432 divided by four in divider 433 also controls the transfer of the data cell in 32-bit words from FIFO register 412. Thus, a 32-bit word is transferred into register 413 and shifted downward and transferred into FIFO 124 as 8-bit bytes.

The 33rd bit 420–423 of registers 410–413, respectively, is used for a locator bit which is a "1" for the last word of the data cell. The locator bit is inserted into the 33rd bit of register 410 by a port output port control 438. The port output control is connected to monitor the locator bit as the data cell is stepped through registers 410–413. The locator bit 423 is also connected to FIFO 124 in the cell transmitter to signal the end of a cell being transferred to the FIFO register.

In operation the switch module output port retrieves data cells from the shared memory according to the address at the head of the priority queue for the port. When a data cell is received via an input port (FIG. 3), the header of the data cell is sent to cell translator 134 in the cell manager. The translator determines the appropriate output port for the cell and the priority of the cell. The buffer memory allocation unit 132 determines a vacant address for storing the data cell in shared memory 100. The address is sent to the output port via bus 455 (FIG. 4) and the priority indication is sent to priority assignment logic 460. The priority assignment logic decodes the priority indication and gates the address into the appropriate one of the priority queue registers 450–453. If the priority register has more than a predetermined number of addresses already in the queue, priority assignment logic 460 adds a congestion indication to the 10th bit associated with the address.

The output port retrieves data cells according to the addresses at the head of the highest order priority queue. More specifically, next address select unit 462 first retrieves data cells according to the addresses in the highest order priority queue 450, then retrieves data cells according to the addresses in the next highest priority queue 451 followed by retrieval according to addresses in the third priority queue 452 and, finally, retrieves data cells according to the addresses in the remaining priority queue, 453. The addresses from the priority queues are transferred to the 9-bit address register 444 via bus 456. The 9-bit address points to the starting point in the shared memory for the data cell. Counter 452, which provides the four least significant bits of the memory address, is set to zero. Accordingly, the 13-bit address supplied to the memory via address bus 104 points to the word at the beginning of the data cell in the memory.

Under control of sequencer 136 and port output control 438, the data cell at the designated address is transferred from memory 100 to cell transmitter 122. The data cell as retrieved from memory is in a 32-bit format. The data words are transferred a word at a time to register 410 via bus 102 and stepped into registers 411 and 412 as additional words arrive. The complete data cell occupies registers 410, 411 and 412. The first word, which is the 4-byte header for the cell, is transferred to the cell translator 134 for an update of the virtual path and virtual circuit in the header according to the link through which the data cell is to be transmitted. Such updating of the header is required in a multicasting situation where the same cell is being transmitted to several different destinations. The updated header is transferred from the translator into register 410 via data bus 102. The subsequent words of the data cell are then shifted into registers 410–412. When the last word of a data cell is received, a locator bit is inserted in the 33rd-bit location of register 410 to indicate the end of the data cell. The location of the data cell, as it is stepped through the register, is determined by monitoring the 33rd-bits in segments 421–423.

Register 413, under the control of out clock 432 and divide-by-four divider unit 433 converts the 32-bit words of the data cell into 8-bit bytes for transfer into FIFO 124. After the data cell has been transferred to FIFO 124 in the cell transmitter, a check sum for the header is added as the fifth byte and the data cell is then transferred to the output link in a serial form.

Buffer Memory Allocation—Content Addressable Memory Embodiment

Buffer memory allocation could theoretically be achieved by maintaining a bit map of all the assigned addresses and port assignments. Because of the multicasting possibility, the bit map must keep track of assigned addresses and each port from which the data cell at the address is to be transmitted. The bit map must be updated each time a data cell is transmitted and the buffer memory address must be indicated as free when all the intended data cell transmissions from a particular address have been completed. Such a memory allocation unit could be constructed using a 512×16 memory array and a search routine which would continue until a vacant address is found. Such a straight forward approach, however, would be unsatisfactory for many applications because of the large variation in the number of searches that may be required to find a free address and because of the time which may be required for the worst case search.

Figure 5:
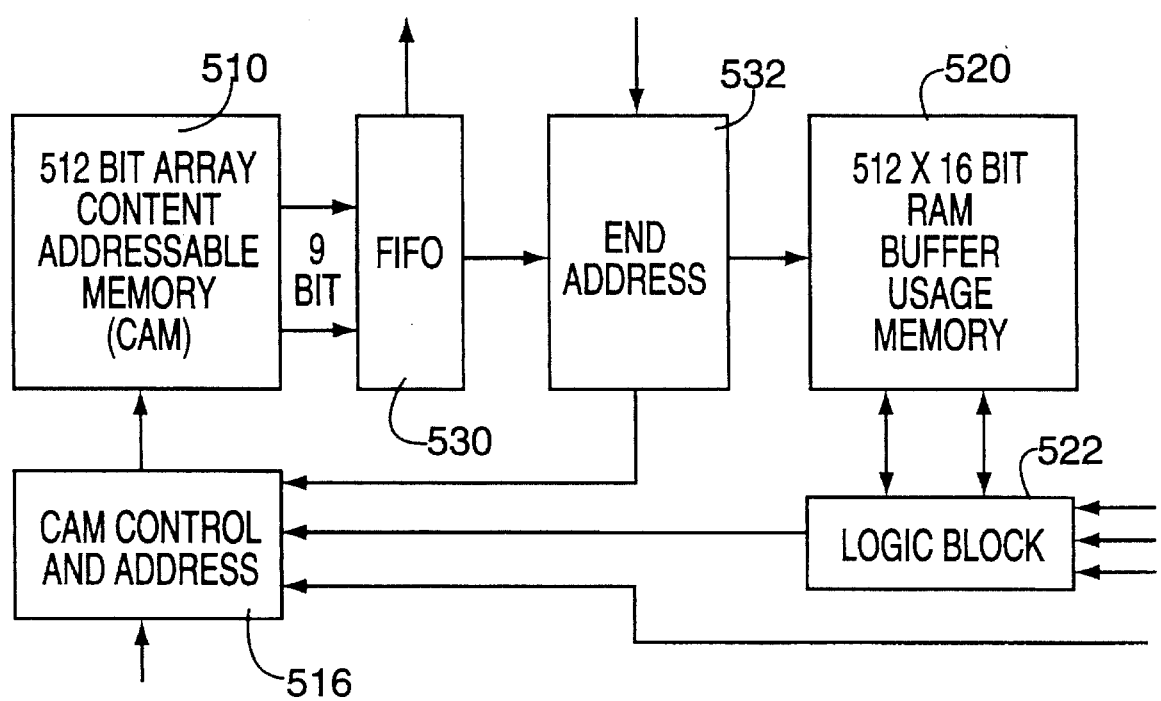
FIG. 5 is a schematic diagram of a content addressable bit-map buffer memory allocation system according to one embodiment of the invention.

One of the preferred buffer memory allocation unit embodiments according to the invention is illustrated in FIG. 5 using a 512×16 bit RAM buffer usage memory 520 in combination 512-bit array content addressable memory (CAM) 510. The buffer usage memory is organized so that the port assignments for a data cell are reflected in the 16-bit word associated with the address assignment for the data cell. Each time an address is assigned for an incoming data cell, a logic block 522 associated with memory 520 places a "1" bit in each memory location corresponding to the port\address assignment. Each time a data cell is transmitted, the address and port information for the transmitted data cell is sent to logic block 522 to erase the corresponding memory bit in usage memory 520. In this manner the usage memory maintains a current map indicating the addresses in use and the ports through which data cells are to be transmitted. Content addressable memory 510 includes a 512-bit memory array, i.e. one bit for each of the 512 assignable addresses in shared buffer memory 100. The bits in the CAM are automatically updated from buffer usage memory 520 via logic block 522 so that an address bit in the CAM becomes "0" when a data cell has been transmitted from all the assigned ports. Content addressable memory 510 can be organized into any convenient bit array such as one including 512 bits arranged into 16 rows and 32 columns. The memory bits in the CAM are interconnected so that the memory can be searched row at a time or column at a time through the associated CAM control and address unit 516. In searching for a free buffer memory address the Cam control and address unit searches all the rows in parallel at one time to locate the rows including one or more "0"s indicating free addresses using flow-through logic. The search then continues by examining the bits in a selected row to locate a free address.

The search result is a 9-bit address which is free in shared buffer memory 100. This address is transferred from the CAM to a FIFO register 530. Preferably, FIFO 530 is capable of storing two addresses since the request for a second free address can be received before the first address is utilized. The end address unit 532 functions as a latch for releasing the buffer usage bits. A content addressable memory with characteristics similar to those described in the above-identified patent application Ser. No. 07/766,062 can be used.

Buffer Memory Allocation-Linked List Embodiment

Figure 6:
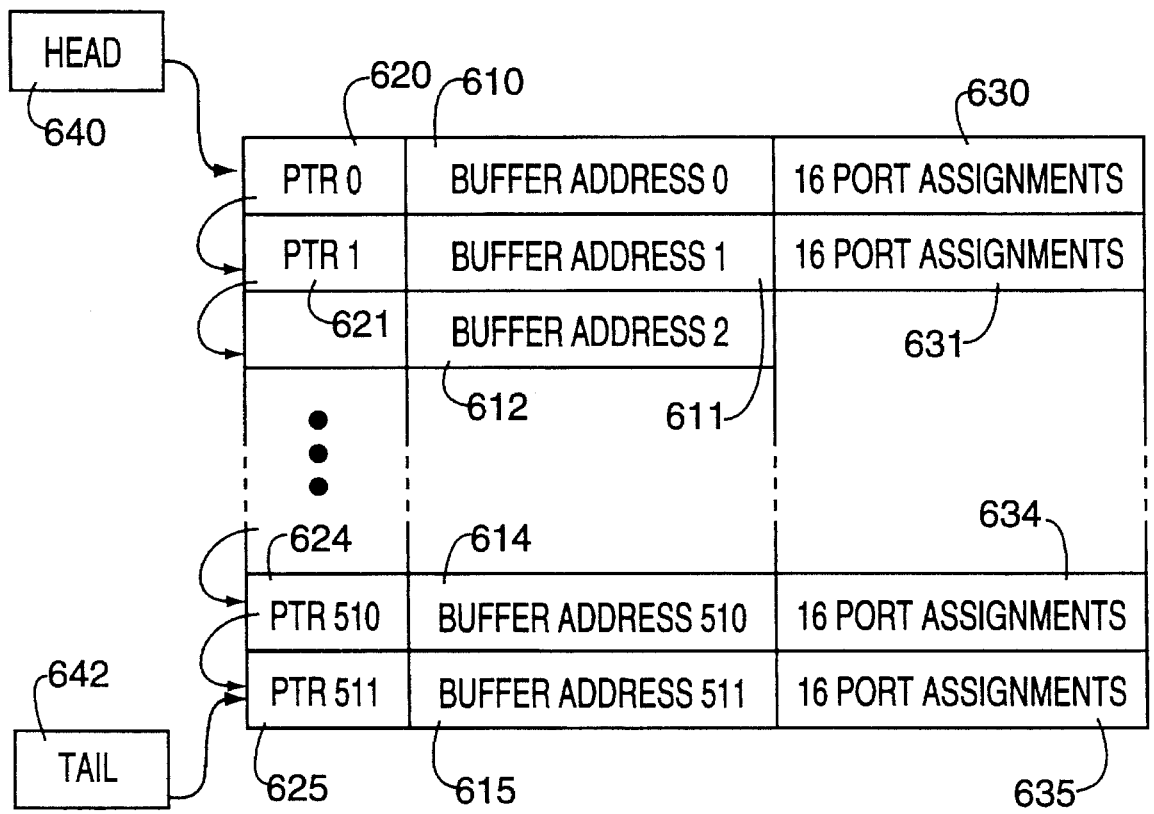
FIG. 6 illustrates a linked list buffer memory allocation system according to another embodiment of the invention.

An alternative technique for assigning buffer memory addresses to incoming cells is through a linked list as illustrated in FIG. 6. The linked list is set up in a memory associated with a microprocessor. Preferably, the microprocessor is dedicated to the task of achieving a rapid address assignments as new cells arrive. Basically, the technique involves maintaining a linked list of the currently unassigned buffer memory addresses. When a buffer memory address is assigned to an incoming cell, the address is removed from the linked list. When a buffer memory address is released meaning that the data cell has been transmitted from all the assigned ports, the address is added to the end of the linked list. In this fashion, the system always maintains a current list of the unassigned buffer addresses available for assignment to incoming cells.

The memory for the linked list is set up as illustrated in FIG. 6. All of the potentially available 512 memory addresses (in 9-bit form) are maintained on a permanent list, 610–615. Each buffer address has an assigned pointer 620–625 and a 16-bit space for port assignments 630–635. A head pointer 640 points to the head of the linked list, and a tail pointer 642 points to the end of the linked list. Initially, before any buffer addresses are assigned, the head pointer points to the first buffer address 610. The pointers associated with the buffer addresses each point to the next buffer address, e.g. pointer 620 points to buffer address 611, pointer 621 points to buffer address 612, etc. The tail pointer 642 points to the last buffer address 615. When a request for a buffer memory address is received, the buffer address pointed to by head pointer 640 is assigned to the incoming cell. The pointer 620 associated with the assigned buffer memory address is transferred to the head pointer, thereby removing the first buffer memory address from the linked list. When the next request for a buffer memory address is received, the head pointer is pointing to the next buffer address 611, which is assigned, and the associated pointer, 621, is transferred to the head pointer. Thus, each time a request for a buffer address is received, the address at the head of the list is assigned and the head pointer is advanced so that it points to the next address on the linked list of unused addresses.

When a buffer address is released and available for reassignment, it is added to the end of the linked list. Each time a data cell is transmitted from an output port, the port assignment bit is changed to "0" and the 16-bit port assignment is checked to determine if any "1"s remain. If not, the address is released. The pointer to the newly released address is inserted as the pointer associated with the last buffer memory address then on the list as pointed to by tail pointer 642. The tail pointer is then reset so that it points to the newly added buffer address at the end of the list. In this manner the newly released buffer memory address is added to the end of the linked list.

The initial linked list, as illustrated in FIG. 6, shows an orderly list progressing from top to bottom. In time the list will be modified so that the order appears to jump around in random fashion. The lack of order in the list, however, has no significant adverse effect on the operation of the linked list buffer addressing scheme.

Translator

The function of translator 134 is to receive the 32-bit header of a data cell to perform an IN-TRAN translation to determine the appropriate exit port and the cell priority or an OUT-TRAN translation to determine the virtual path and virtual circuit for the outgoing data cell which is to be transmitted. The OUT-TRAN translation becomes necessary for multicasting where the same cell is sent to several destinations each having a different virtual path/virtual circuit. The ATM standards provide bits in the header for a range of 4k virtual path ("VP") addresses, and 64k virtual circuit ("VC") addresses for each virtual path. In the illustrative embodiment there are sixteen ports, each of which could potentially have the full range VP/VC addresses and require on the order of $2^{32}$ translations. Since this is far more than are economically useable in the foreseeable future, a data compression is desirable in the translator.

Figure 7:
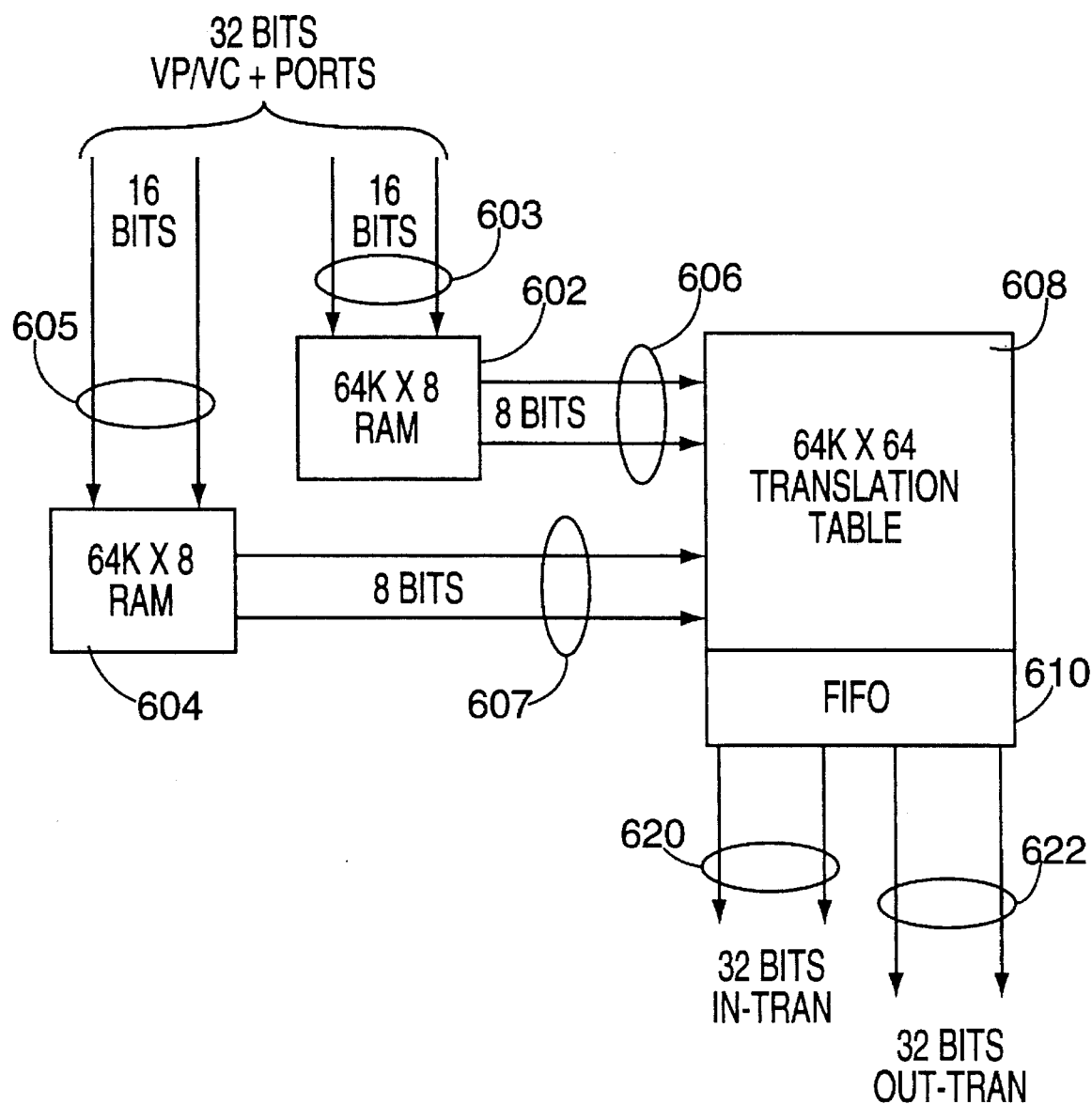
FIG. 7 is a schematic diagram of a translator for interpreting data cells.

The design of the data compressor depends on the number of VP/VC combinations the system is intended to service. An example of data compression for the translator in accordance with the invention is achieved as illustrated in FIG. 7. Translator 134 is located within the cell manager and responds to 12 bits for the virtual path designation, 16 bits for the virtual circuit designation, and 4 bits for the port designation. The cell manager extracts the 28-bit VP/VC designation from the data on the data bus and adds the 4-bit port designation according to the active port.

In the example in FIG. 7, the incoming 32 bits are divided into two 16 bit groups 603 and 605 which are supplied respectively to 64k×8 RAMs 602 and 604. The 8 bits 606 from memory 602 and the 8 bits 607 from memory 604 are supplied as a 16-bit address to a 64k×64 memory translation table 608. The translation emerges from memory 608 as a 64-bit word which includes 32 bits for the incoming IN-TRAN cell translation 620 and 32 bits for the outgoing OUT-TRAN translation 622. The IN-TRAN translation for an incoming data cell supplies the outgoing port and priority for the cell. The OUT-TRAN translation for an outgoing data cell supplies the virtual path and virtual circuit appropriate for the outgoing link. The 64-bit word emerging from memory 608 is more than adequate for the translations and, hence, some spare bits are available for other purposes. The translation result is placed in a selected one of three 64-bit FIFO registers 610.

The allocation of the VP/VC and port bits to address RAMs 602 and 604 is a matter of design choice depending largely upon the expected distribution of the virtual paths and virtual circuits. The contents of the 64k locations of the translation table are set by control processor 150 shown in FIGS. 1 and 3. The control processor creates and deletes the VP/VC addresses used in the translation table. Usually the VP/VC address information is maintained in the translation table only for the duration of a call.

Although only a few illustrative embodiments have been described in detail in the foregoing specification, it should be obvious that there are numerous variations in the circuit configurations and operating sequences which are within the contemplated scope of the invention. The invention is more particularly defined in the appended claims.

I claim:

1. A buffered communication switch for switching data cells between input ports and selected output ports, comprising:

one or more input ports for receiving incoming data cells;

a plurality of output ports;

a shared buffer memory for storing data cells received via said one or more input ports while awaiting transmission via one or more of said output ports;

a common bus interconnecting said input ports, said output ports, and said shared buffer memory;

means for examining said incoming data cells to select one or more of said output ports appropriate for transmission of the cell;

means for selecting a vacant address in said shared buffer memory for storing one of said incoming data cells;

means for storing said one of said incoming data cells to provide a stored data cell at said vacant address and for storing the address thereof at one or more of said output ports selected for transmission of said stored data cell;

means for retrieving said stored data cell when time is available for transmission thereof via said selected one or more output ports; and wherein the transfer of an incoming data cell from said input ports to said shared buffer memory is interleaved via said common bus with the transfer of data cells from said shared buffer memory to said output ports.

2. A buffered communication switch according to claim 1 wherein said means for selecting a vacant address includes means for maintaining a linked list of vacant addresses;

means, coupled to said means for storage, for removing an address from said linked list when assigned for storage of a data cell; and means, coupled to said means for retrieving, for adding an address to said linked list when the data cell stored at the address has been transmitted from all selected ports for said data cell.

3. A buffered communication switch according to claim 1 wherein said means for selecting a vacant address includes a memory map maintained to indicate currently assigned exit ports for stored data cells; and a content addressable memory means using parallel flow through logic to determine a vacant address and for storing said incoming data cell at said vacant address in said shared buffer memory.

4. A buffered communication switch according to claim 1 wherein said means for examining incoming data cells includes a translator for examining the header of said incoming data cell to determine the output port or ports and the cell priority.

5. A buffered communication switch according to claim 4 for routing data cells according to virtual path and circuit designations in the data cell wherein said translator operates on a data compressed format according to the number of virtual paths and circuits being serviced.

6. A buffered communication switch according to claim 1 wherein said means for examining incoming data cells includes a translator for examining and translating the header of said incoming data cell and wherein other data cells are being transferred to and from said shared memory on a word-by-word basis while translations are being carried out.

7. A buffered communication switch according to claim 6 further including means for transmitting said data cell from one or more of said output ports when time is available; and translator means for examining the header of each outgoing data cell and changing said header according to the outgoing transmission link.

8. A buffered communication switch according to claim 1 wherein said means for storing and said means for retrieving operate on a word-by-word interleaved basis.

9. A buffered communication switch for the priority switching of data cells between input ports and selected output ports, said data cells each having a data cell priority, comprising:

one or more input ports for receiving incoming data cells;

a plurality of output ports each including a plurality of priority address queues associated therewith;

a shared buffer memory for storing said incoming data cells received via said one or more input ports while awaiting transmission via one or more of said output ports;

a translator for examining said incoming data cells
to determine the data cell priority, and
to select one or more of said output ports for subsequent transmission of said incoming data cells;

an address selector for selecting a vacant address in said shared buffer memory for storing an incoming data cell;

means for storing said incoming data cell to provide a stored data cell at said vacant address determined by said address selector and for storing said vacant address in a selected priority queue at said one or more output ports selected by said translator for subsequent transmission of said stored data cell; and means for retrieving coupled to said shared memory to receive said stored data cell at said address in said shared memory for transmission of said stored data cell via said selected output port when said address is at the head of the highest occupied priority queue at said selected port.

10. A buffered communication switch according to claim 9 wherein said address selector for selecting a vacant address includes means for maintaining a linked list of vacant addresses;

means, coupled to said means for storage, for removing an address from said linked list when assigned for storage of a data cell; and means, coupled to said means for retrieving, for adding an address to said linked list when the data cell stored at the address has been transmitted from all selected ports for said data cell.

11. A buffered communication switch according to claim 9 wherein said address selector for selecting a vacant address includes a memory map maintained to indicate currently assigned output ports for stored data cells; and a content addressable memory means using parallel flow through logic to determine a vacant address and for storing said incoming data cell at said vacant address in said shared buffer memory.

12. A buffered communication switch according to claim 9 for routing data cells according to virtual path and circuit designations in the data cell wherein said translator operates on a data compressed format according to the number of virtual paths and circuits being serviced.

13. A buffered communication switch according to claim 9 wherein said translator examines and translates the header of said incoming data cell and wherein other data cells are being transferred to and from said shared memory on a word-by-word basis while translations are being carried out.

14. A buffered communication switch according to claim 13 further including means for transmitting said data cell from one or more of said output ports when time is available; and further translator means for examining the header of each outgoing data cell and changing said header according to the outgoing transmission link.

15. A buffered communication switch according to claim 9 wherein said means for storing and said means for retrieving operate on a word-by-word interleaved basis.

16. A buffered communication switch for switching multiword data cells between input ports and selected output ports, comprising:

a plurality of input ports for receiving incoming data cells;

a plurality of output ports;

a shared buffer memory for storing said incoming data cells received via said input ports while awaiting transmission via one or more of said output ports;

a translator for examining said incoming data cells to designate one or more of said output ports for transmission of said incoming data cells;

an address selector for selecting a vacant address in said shared buffer memory for storing an incoming data cell;

means for storing said incoming data cell at said vacant address to provide a stored data cell and for storing the address thereof at said one or more output ports selected for transmission of said stored data cell; and means for retrieving coupled to said shared memory to receive said stored data cell at said address in said shared memory when time is available for transmission of said data cell via said selected one or more output ports;

said means for storing and said means for retrieving being operable to transfer data cells to and from said shared buffer memory on a word-by-word basis.

17. A buffered communication switch according to claim 16 wherein said address selector includes means for maintaining a linked list of vacant addresses;

means, coupled to said means for storage, for removing an address from said linked list when assigned for storage of a data cell; and means, coupled to said means for retrieving for adding an address to said linked list when the data cell stored at the address has been transmitted from all selected ports for said data cell.

18. A buffered communication switch: according to claim 16 wherein said address selector includes a memory map maintained to indicate currently assigned output ports for stored data cells; and a content addressable memory means using parallel flow through logic to determine a vacant address for storing said incoming data cell at said vacant address in said shared buffer memory.

19. A buffered communication switch according to claim 16 wherein said translator for examining incoming data cells also determines cell priority.

20. A buffered communication switch according to claim 19 for routing data cells according to virtual path and circuit designations in the data cell wherein said translator operates on a data compressed format according to the number of virtual paths and circuits being serviced.

21. A buffered communication switch according to claim 16 wherein said translator examines and translates the header of said incoming data cell and wherein other data cells are being transfered to and from said shared memory on a word-by-word basis while translations are being carried out.

22. A buffered communication switch according to claim 21 further including means for transmitting said data cell from one or more of said output ports when time is available; and further translator means for examining the header of each outgoing data cell and changing said header according to outgoing transmission link.

23. A buffered communication switch for the priority switching of multiword data cells between input ports and selected output ports, said data cells each having a data cell priority, comprising:

one or more input ports for receiving incoming data cells;

a plurality of output ports each including a plurality of priority address queues associated therewith;

a shared buffer memory for storing said incoming data cells received via said one or more input ports while awaiting transmission via one or more of said output ports;

a translator for examining said incoming data cells to determine the data cell priority, and to select one or more of said output ports for subsequent transmission of said incoming data cell;

an address selector for selecting a vacant address in said shared buffer memory for storing an incoming data cell;

means for storing said incoming data cell to provide a stored data cell at said vacant address and for storing the address thereof in a selected priority queue at each of said one or more output ports selected according to said cell priority; and means for retrieving coupled to said shared buffer memory to receive said stored data cell at a retrieval address in said shared memory when said retrieval address is at the head of the highest occupied priority queue at said selected port;

said means for storing and said means for retrieving being operable to transfer data cells to and from said shared buffer memory on an interleaved word-by-word basis.

24. A buffered communication switch according to claim 23 wherein said address selector includes means for maintaining a linked list of vacant addresses;

means, coupled to said means for storage, for removing an address from said linked list when assigned for storage of a data cell; and means, coupled to said means for retrieving, for adding an address to said linked list when the data cell stored at the address has been transmitted from all selected ports for said data cell.

25. A buffered communication switch according to claim 23 wherein said address selector includes a memory map maintained to indicate currently assigned exit ports for stored data cells; and a content addressable memory means using parallel flow through logic to determine a vacant address and for storing said incoming data cell at said vacant address in said shared buffer memory.

26. A buffered communication switch according to claim 23 for routing data cells according to virtual path and circuit designations in the data cell wherein said translator operates on a data compressed format according to the number of virtual paths and circuits being serviced.

27. A buffered communication switch according to claim 23 wherein said translator examines and translates the header of an incoming data cell while other data cells are being transferred to and from said shared memory on an interleaved word-by-word basis.

28. A buffered communication switch according to claim 23 further including means for transmitting said data cell from one or more of said output ports when time is available; and further translator means for examining the header of each outgoing data cell and changing said header according to outgoing transmission link.

29. A method of telecommunication switching of multiword data cells between input ports and selected output ports, comprising the steps of:

receiving an incoming data cell via an input port;

examining said incoming data cell to select one or more output ports appropriate for retransmission of the cell;

using a shared buffer memory for storing incoming data cells received via the input ports while awaiting transmission via one or more of the output ports;

selecting a vacant address in the shared buffer memory for storing said incoming data cell;

storing said incoming data cell at said vacant address to provide a stored data cell;

storing said address at one or more output ports selected for re-transmission of said stored data cell; and retrieving said stored data cell in the shared memory when time is available for re-transmission of said stored data cell via each of said one or more selected output ports; and wherein the transfer of incoming data cells for storage in said shared buffer memory is interleaved with the transfer of stored data cells from said shared buffer memory to said output ports.

30. The method according to claim 29 wherein said selection of a vacant address in the shared buffer memory includes maintaining a linked list of vacant addresses;

removing an address from said linked list when assigned for storage of a data cell; and adding an address to said linked list when the data cell stored at the address has been transmitted from all selected ports for said data cell.

31. The method according to claim 29 wherein said selection of a vacant address in the shared buffer memory includes maintaining a memory map to indicate currently assigned exit ports for stored data cells; and using parallel flow through logic in a content addressable memory to determine a vacant address.

32. The method according to claim 29 wherein the header of said incoming data cell is examined and translated to determine the output port or ports and the cell priority.

33. The method according to claim 32 for routing data cells according to virtual path and circuit designations in the data cell wherein said translation is on a data compressed format according to the number of virtual paths and circuits being serviced.

34. The method according to claim 32 wherein the header of said incoming data cell is translated while other data cells are being transferred to and from said shared memory on a word-by-word basis.

35. The method according to claim 34 further including transmitting said data cell from one or more of said output ports when time is available, and translating the header of each outgoing data cell to change said header according to the outgoing transmission link.

36. The method according to claim 29 wherein said storing of said incoming data cell and said retrieving of said data cell is on a word-by-word interleaved basis.

37. A method of telecommunication priority switching of data cells between input ports and selected output ports, each data cell including a data cell priority and each output port having a plurality of priority queues, including the steps of:

receiving an incoming data cell via one of the input ports;

using a shared buffer memory for storing said incoming data cells received via the input ports while awaiting transmission via one or more of the output ports;

examining said incoming data cell
to determine the data cell priority, and
to select one or more of the output ports for retransmission of the incoming data cell;

selecting a vacant address in said shared buffer memory for storing said incoming data cell;

storing said incoming data cell to provide a stored data cell at said vacant address and storing said address in a priority queue selected according to said data cell priority at each of the one or more output ports selected for retransmission of said stored data cell; and retrieving said stored data cell in the shared memory for retransmission of said stored data cell via each of the one or more selected output ports when said address is at the head of the highest occupied priority queue at each of the one or more selected ports.

38. The method according to claim 37 wherein said selection of a vacant address in the shared buffer memory includes maintaining a linked list of vacant addresses;

removing an address from said linked list when assigned for storage of a data cell; and adding an address to said linked list when the data cell stored at the address has been transmitted from all selected ports for said data cell.

39. The method according to claim 37 wherein said selection of a vacant address in the shared buffer memory includes maintaining a memory map to indicate currently assigned exit ports for stored data cells; and using parallel flow through logic in a content addressable memory to determine a vacant address.

40. The method according to claim 37 wherein the header of said incoming data cell is examined and translated while other data cells are being transferred to and from said shared memory on a word-by-word basis.

41. The method according to claim 40 further including transmitting said data cell from one or more of said output ports when time is available, and translating the header of each outgoing data cell to change said header according to the outgoing transmission link.

42. The method according to claim 37 wherein said storing of said incoming data cell and said retrieving of said data cell is on a word-by-word interleaved basis.

43. A method of telecommunication switching multi-word data cells between input ports and selected output ports, comprising the steps of:

receiving an incoming data cell at one of the input ports;

using a shared buffer memory for storing said incoming data cell received via the input ports while awaiting retransmission via one or more of the output ports;

examining said incoming data cell to designate one or more of the output ports for retransmission of said incoming data cell;

selecting a vacant address in said shared buffer memory for storing said incoming data cell;

storing said incoming data cell to provide a stored data cell at said vacant address and storing the address of said stored data cell at the one or more output ports selected for retransmission of said cell; and retrieving said stored data cell at said address in said shared memory when time is available for retransmission of said stored data cell via each of the one or more selected output ports;

the storing and retrieving of data cells to and from said shared buffer memory being on an interleaved word-by-word basis.

44. The method according to claim 43 wherein said selection of a vacant address in the shared buffer memory includes maintaining a linked list of vacant addresses;

removing an address from said linked list when assigned for storage of a data cell; and adding an address to said linked list when the data cell stored at the address has been transmitted from all selected ports for said data cell.

45. The method according to claim 43 wherein said selection of a vacant address in the shared buffer memory includes maintaining a memory map to indicate currently assigned exit ports for stored data cells; and using parallel flow through logic in a content addressable memory to determine a vacant address.

46. The method according to claim 43 wherein the header of said incoming data cell is examined and translated to determine the output port or ports and the cell priority.

47. The method according to claim 46 for routing data cells according to virtual path and circuit designations in the data cell wherein said translation is on a data compressed format according to the number of virtual paths and circuits being serviced.

48. The method according to claim 43 wherein the header of said incoming data cell is examined and translated while other data cells are being transfered to and from said shared memory on a word-by-word basis.

49. The method according to claim 48 further including transmitting said data cell from one or more of said output ports when time is available, and translating the header of each outgoing data cell to change said header according to the outgoing transmission link.

50. A method of telecommunication priority switching of multi-word data cells between input ports and selected output ports, each output port having a plurality of priority queues and each of said data cells including a data cell priority, including the steps of:

receiving an incoming data cell via one the input ports;

using a shared buffer memory for storing incoming data cells received via the input ports while awaiting transmission via one or more of the output ports;

examining the incoming data cell
to determine the data cell priority, and
to select one or more of the output ports appropriate for retransmission of the cell;

selecting a vacant address in said shared buffer memory for storing said incoming data cell;

storing said incoming data cell at said vacant address to provide a stored data cell and storing said address in a priority queue selected according to said data cell priority at each of the one or more output ports selected for retransmission of said stored data cell; and retrieving said stored data cell at said address in the shared memory for retransmission of said stored data cell via each of the one or more selected output ports when said address is at the head of the highest occupied priority queue at the selected ports;

the storing and retrieving of data cells to and from said shared buffer memory being on an interleaved word-by-word basis.

51. The method according to claim 50 wherein said selection of a vacant address in the shared buffer memory includes maintaining a linked list of vacant addresses;

removing an address from said linked list when assigned for storage of a data cell; and adding an address to said linked list when the data cell stored at the address has been transmitted from all selected ports for said data cell.

52. The method according to claim 50 wherein said selection of a vacant address in the shared buffer memory includes maintaining a memory map to indicate currently assigned exit ports for stored data cells; and using parallel flow through logic in a content addressable memory to determine a vacant address.

53. The method according to claim 50 for routing data cells according to virtual path and circuit designations in the data cell wherein said examination of the received data cell includes a translation on a data compressed format according to the number of virtual paths and circuits being serviced.

54. The method according to claim 50 wherein the header of said incoming data cell is translated while other data cells are being transfered to and from said shared memory on a word-by-word basis.

55. The method according to claim 54 further including transmitting said data cell from one or more of said output ports when time is available, and translating the header of each outgoing data cell to change said header according to the outgoing transmission link.

* * * * *